United States Patent
Bianchini et al.

(10) Patent No.: US 7,753,670 B2
(45) Date of Patent: Jul. 13, 2010

(54) MOULDING DEVICE FOR THE MANUFACTURE OF THERMOPLASTIC CONTAINERS

(75) Inventors: Cédric Bianchini, Octeville-sur-Mer (FR); Alexandre Toutoux, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 217 days.

(21) Appl. No.: 11/826,586

(22) Filed: Jul. 17, 2007

(65) Prior Publication Data

US 2008/0020085 A1    Jan. 24, 2008

(30) Foreign Application Priority Data

Jul. 21, 2006  (FR) ................... 06 06716

(51) Int. Cl.
*B29C 49/48* (2006.01)
*B29C 49/56* (2006.01)

(52) U.S. Cl. ................ 425/182; 425/195; 425/522; 425/540; 425/541

(58) Field of Classification Search ............. 425/182, 425/195, 522, 540, 541
See application file for complete search history.

(56) References Cited

U.S. PATENT DOCUMENTS 3,782,879 A * 1/1974 Mnilk et al. ............... 425/541
5,411,391 A * 5/1995 Albrecht et al. ............ 425/522
5,968,560 A * 10/1999 Briere et al. ............... 425/522
6,099,286 A    8/2000 Nitsche
6,729,868 B1   5/2004 Vogel et al.
6,733,272 B1 * 5/2004 Derouault et al. .......... 425/541
6,948,924 B2 * 9/2005 Tsau et al. ................. 425/195
6,994,542 B2 * 2/2006 Tsau et al. ................. 425/522

FOREIGN PATENT DOCUMENTS

| DE | 199-29-033 A1 | 12/2000 |
| FR | 2-659-265 A1  | 9/1991  |
| FR | 2-790-703 A1  | 9/2000  |
| JP | 10-230545 A   | 9/1998  |

\* cited by examiner

*Primary Examiner*—Robert B Davis
(74) *Attorney, Agent, or Firm*—Sughrue Mion, PLLC

(57) ABSTRACT

A device for the moulding of thermoplastic containers by blowing comprises a mould (1) with two half-moulds (2, 3), each having a support (5, 6) and a mould block (7, 8) between which, in one half-mould, a compensating chamber (20) is defined, with elastic return means (26) and abutment means (27) being interposed, which are combined in unitary assemblies (35) each comprising: a bore (36) passing through the support and receiving a pin (38) having one end (39) fastened to the mould block and a first radial shoulder (40) against which bears the end (E) of a sleeve (46) screwed in the bore and having an outer head (47) capped by an axially displaceable housing (49), with the elastic return means being interposed, which are preloaded by a nut (53) screwed on the free end of the pin against a second radial shoulder (54) of the pin, at the same time pushing the housing.

9 Claims, 4 Drawing Sheets

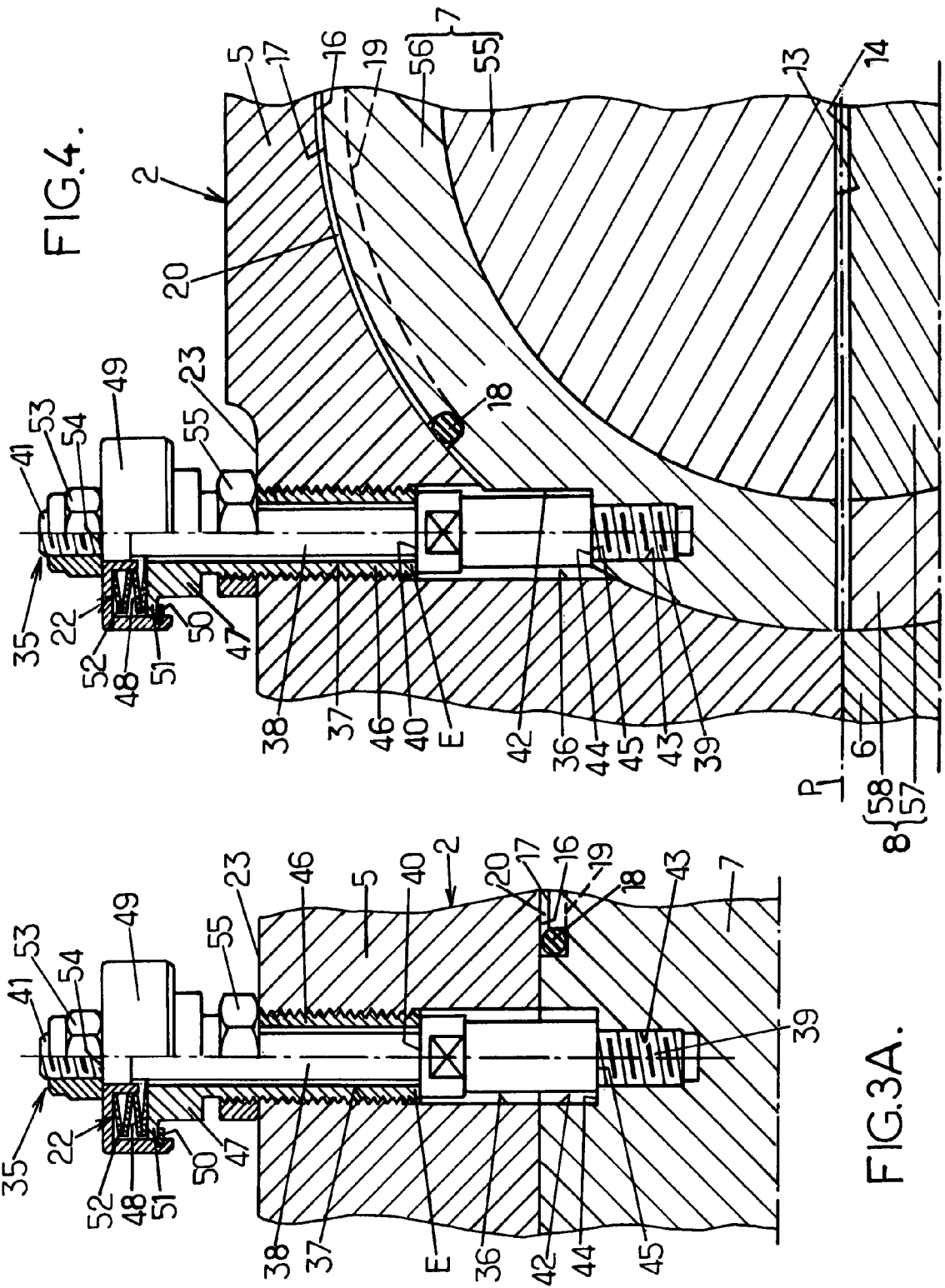

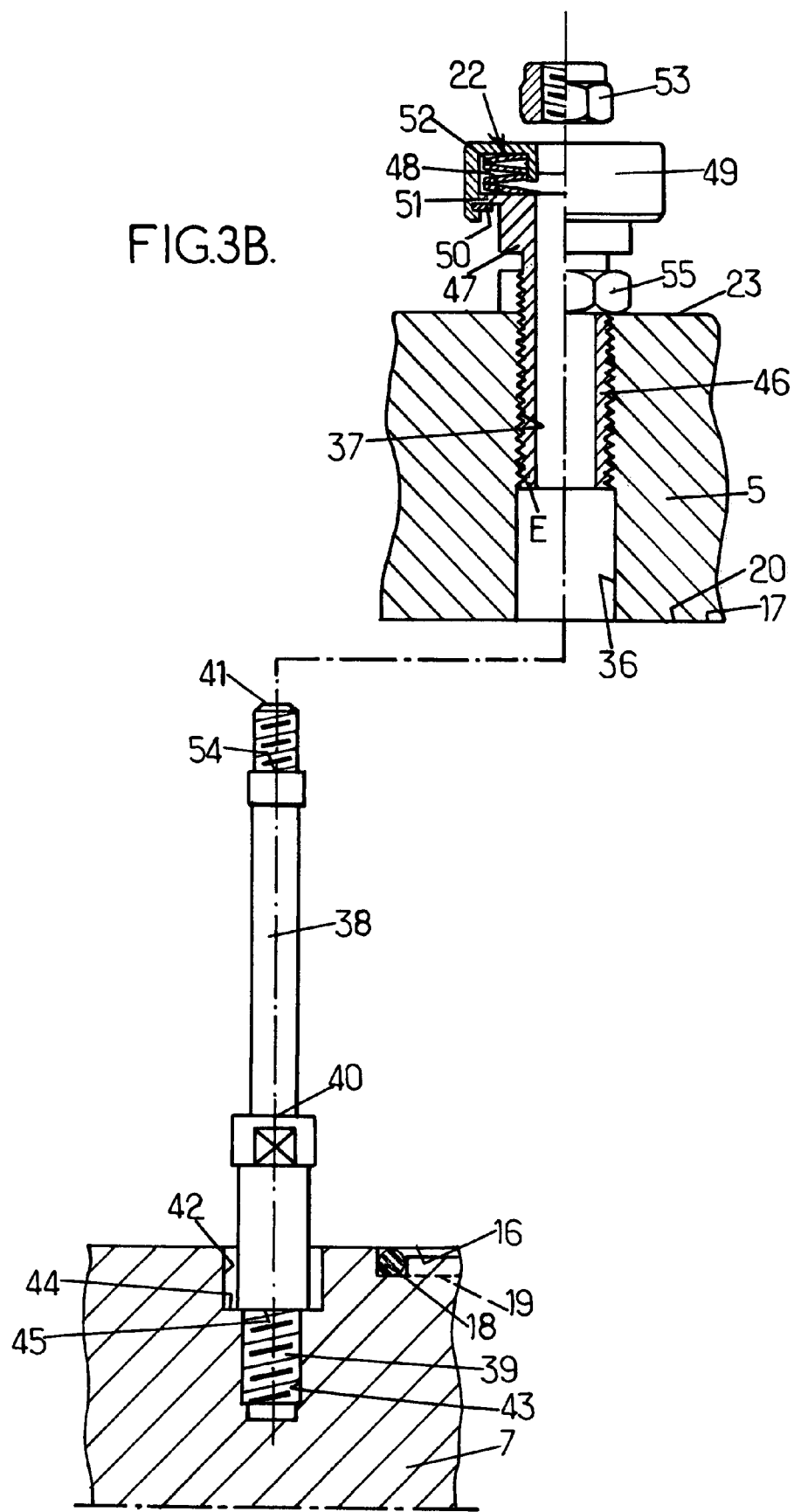

MOULDING DEVICE FOR THE MANUFACTURE OF THERMOPLASTIC CONTAINERS

FIELD OF THE INVENTION

The present invention relates in general terms to the field of the moulding of containers, especially of bottles, made from thermoplastic, such as PET, by the blowing or draw-blowing of heated preforms, and it relates more specifically to improvements made to the devices for the moulding of containers, especially of bottles, made from thermoplastic, such as PET, by the blowing or draw-blowing of heated preforms, said devices comprising at least one mould with a compensating chamber.

More precisely, the invention relates to improvements made to the devices for the moulding of containers, especially of bottles, made from thermoplastic, such as PET, by the blowing or draw-blowing of heated preforms, which moulding devices comprise at least one mould comprising at least two half-moulds respectively comprising two supports and two mould blocks defining a parting plane in the closing position of the mould, a leak-tight compensating chamber being defined between the support and the mould block of one half-mould, such that, by a fluid being injected under pressure into the compensating chamber, said mould block is moved apart from said support, a plurality of elastic return means and a plurality of abutment means being interposed between said support and said mould block and being arranged such that, in the absence of fluid under pressure in the compensating chamber, said mould block occupies a retracted position in the support.

BACKGROUND OF THE INVENTION

A moulding device of the type addressed by the invention is illustrated diagrammatically in FIG. 1 of the accompanying drawings.

The mould, designated as a whole by the reference numeral 1, comprises, in the configuration illustrated, two half-moulds 2 and 3 suitable respectively for forming the assembly consisting of the shoulder, of the body and of the bottom of the containers; in another possible configuration, the mould may comprise three elements, to be precise two half-moulds 2 and 3 for forming the shoulder and the body of the containers and a vertical movable mould bottom for forming the bottom of the containers.

In the example illustrated, the mould 1 is formed from two half-moulds 2, 3 which are articulated in rotation with respect to one another on a shaft 4 (jackknife mould), since this is the type of mould in most common use in the installations produced by the applicant; however, it must be understood that the invention is not aimed solely at this type of mould and may be employed in moulds of other types, especially moulds in which the half-moulds are movable linearly.

The half-moulds 2, 3 comprise two supports 5, 6 respectively and two mould blocks 7, 8 respectively which are supported by the latter. In the example illustrated, the mould blocks have a cross section of substantially rectangular general shape. The two mould blocks 7, 8 are pierced with two respective moulding recesses which together form a moulding cavity 11 of axis 12. The two mould blocks 7, 8 possess cooperating faces or bearing faces 13 and 14 respectively, which, in the mould-closing and the blowing position, are in mutual bearing contact along a parting plane P.

The supports 5, 6 are arranged so as to have, on one side, respective projecting lugs which are spaced apart from one another and to which are connected actuation means (opening/closing), designated as a whole by 9, which may be of any suitable configuration, and, on the opposite side, means for locking in the closing position, designated as a whole by 10, which themselves may have any suitable configuration.

A particular half-mould of the two half-moulds (here, the half-mould 2 located on the left in FIG. 1) is arranged such that a leak-tight chamber 20, called a "compensating chamber", is defined between the respective assembly faces 16, 17 of its support 5 and of its mould block 7 by a seal 18 (seated in a groove 19 pierced, for example, in the assembly face 17 of the mould block 7), and such that said mould block 7 is displaceable in relation to the support 5 substantially perpendicularly to its bearing face 13. In the mould configuration of substantially quadrangular shape, illustrated by way of example in FIG. 1, the abovementioned assembly faces 16, 17 and the bearing faces 13, 14 are substantially parallel, and the compensating chamber 20 is substantially parallel to the bearing face 13 of the mould block 7.

The wall of the support 5 of the particular half-mould 2 is pierced with a passage duct 25 issuing into the compensating chamber 20. The duct 25 is connected (not shown) to a source of fluid under high pressure. In practical terms, the duct 25 may be connected to the source of blowing fluid, and in this case the situation is such that the projection of the surface of the compensating chamber 20 onto the parting plane P is greater than the projection of the surface of the moulding cavity 11 onto said parting plane P. During blowing, under the action of the pressure prevailing in the compensating chamber 20, the mould block 7 is pushed in the direction of the opposite mould block 8, and its bearing face 13 is pressed firmly against the bearing face 14 of the mould block 8.

Once blowing is completed, to ensure the mould block 7 returns into its retracted position on the bottom of the respective support 5, there is provision for the mould block 7 to be supported by the respective support 5 by elastic return means 26. A simple solution, illustrated in FIG. 1, involves, in order to form each elastic return means 26, interposing an elastic return member 22 between the head of a bolting member 21 and the outer face 23 of the support 5. The elastic return members 22 may consist of especially one-piece tubular springs made from synthetic material (typically from polyurethane), for moulds of cold-cycle use, or of exact stacks of metal spring washers, for moulds of hot-cycle use.

The mould block 8 (located on the right in FIG. 1) is itself supported fixedly by the respective support 6 by means of bolting members 24.

A mould arranged, as just described with reference to FIG. 1 of the accompanying drawings, is disclosed in the document FR 2 659 265 (FIG. 1 of the accompanying drawings being repeated in FIG. 1 of this document), to which reference may be made for fuller explanations.

However, this document omits to mention and illustrate abutment means suitable for maintaining the mould block 7 in its retracted position, such that the compensating chamber 20 formed between the aforesaid assembly faces 16 and 17 of the support 5 and of the mould block 7 respectively is represented by an interval j defined mechanically.

FIG. 2 of the accompanying drawings illustrates separately an exemplary embodiment of the abutment means 27 with which the mould 1 is equipped. Each abutment means 27 comprises a stop rod 28 screwed into a bore 29 passing through the support 5. The inner end 30 of the stop rod 28 comes to bear against the mould block 7; in particular, it may be in bearing contact, if appropriate with a bearing insert 32 being interposed, against the bottom of a clearance 31 pierced in the mould block 7 substantially coaxially to the bore 29.

The rotation of the stop rod 28 makes it possible to set the value of the interval j. A lock nut 34 may be provided on the free end 33 of the stop rod 28 for blocking in the adjustment position in terms of rotation.

Of course, the arrangements which have just been explained have been incorporated in a particularly expedient way in the moulds currently manufactured by the applicant, in which each mould block is of the composite type and comprises a shell equipped with the moulding recess and a shell carrier supporting said shell and itself supported by the support. The compensating chamber is then provided between the assembly faces of the support and of the shell carrier, with elastic return means and abutment means interposed between the support and the mould block being implemented. Such moulds with a compensating chamber are described particularly in the document FR 2 733 176 in the applicant's name, although the presence of the elastic return means and of abutment means is not explained in this document.

Whatever the type of mould in question, even though this known arrangement is entirely satisfactory in operational terms, it has several disadvantages.

A first disadvantage is that the support 5 and the mould block 7 of the half-mould 2 comprise, in the embodiment illustrated in the document FR 2 659 265, elastic return means 26, of which there are eight arranged in two columns, and abutment means 27, of which there are four, all being located on either side of the compensating chamber 20. These numerous drill holes and machinings mechanically weaken these components which, moreover, are subjected to very high mechanical stresses during blowing.

In subsequent productions, the number of the elastic return means has been reduced to four; however, the total number of drill holes still remains high.

In any event, the demounting and then remounting of the mould block 7 (for example, for a change in manufacture with a different moulding cavity) make it necessary to demount and then remount the numerous elastic return means and abutment means.

Above all, another major disadvantage is that, during each remounting, it is necessary to repeat the settings of the return and abutment prestress for each of the means in question. It becomes clear that the setting of the abutment means systematically disturbs the setting of the elastic return means for compensation, thus making it necessary to repeat these settings alternately.

Furthermore, the springs made of synthetic material which are used in the moulding devices of cold-cycle operation lose their elasticity progressively and finally become slack, thus making it necessary to replace them regularly.

In turn, the metallic spring washers are assembled in the form of a stack, with their alternate positioning being adhered to. Practice shows, however, that, during the remounting operations, washers may be remounted in insufficient numbers and/or without adhering to their alternate positioning in the stack. Consequently, the elastic return means may then lose their effectiveness to a considerable extent, and it becomes necessary to redemount the elastic return means in order to complete and/or reposition the spring washers correctly.

Finally, in practice, each demounting and then remounting of the mould block 7 requires considerable work and necessitates a large amount of setting time before the mould is once again in the correct operating state. In a high-capacity moulding installation of the turntable type incorporating a large number of moulds (for example, up to 34 moulds), any alteration in manufacture involving a change of mould blocks has a highly adverse effect in terms of work and of cost because of the long period of shutdown of the installation.

SUMMARY OF THE INVENTION

There is, therefore, on the part of the operators of such moulding installations, an urgent requirement that these disadvantages be eliminated or at least greatly diminished, so that the operating conditions of these installations can be improved substantially.

To this end, the invention proposes a device for the moulding of containers, especially of bottles, made from thermoplastic, such as PET, by the blowing or draw-blowing of heated preforms, which moulding device comprises at least one mould comprising at least two half-moulds respectively comprising two supports and two mould blocks defining a parting plane in the closing position of the mould, a leak-tight compensating chamber being defined between the support and the mould block of a half-mould, such that, by a fluid being injected under pressure into the compensating chamber, said mould block is moved apart from said support, a plurality of elastic return means and a plurality of abutment means being interposed between said support and said mould block and being arranged such that, in the absence of fluid under pressure in the compensating chamber, said mould block occupies a retracted position in the support, characterized in that said elastic return means and said abutment means are equal in number and are combined respectively in pairs in the form of unitary assemblies each comprising:

- a bore passing through the support on the outside of the compensating chamber and substantially perpendicularly to the parting plane and issuing opposite the mould block,
- a pin passing coaxially through said bore of the support and having one end secured to the mould block, said pin comprising a first radial annular shoulder facing its free end,
- a tubular sleeve screwed into said bore such that its inner end bears on said first radial shoulder of the pin, said tubular sleeve having a head which is external to the support and which defines a bearing plate,
- a housing capping said head of the tubular sleeve and capable of an axial displacement of limited amplitude with respect to said head of the sleeve,
- elastic return means interposed between the head of the tubular sleeve and the housing, and
- a nut for preloading the elastic return means, which is screwed on the free end of the pin, at the same time pushing the housing against a second radial shoulder of said pin.

By virtue of this arrangement, the setting of the preload of the elastic return means and the setting of the abutment are predetermined by the structure of the unitary assembly. Thus, these settings remain strictly independent of one another and without any influence on one another, and no repeat of these settings has to be carried out on the mould during mounting.

When the mould block has to be separated from the support, the tubular sleeve remains secured to the support, without any change in its position, and the elastic return member remains enclosed in the housing. In turn, the pin remains secured to the mould block. Subsequently, the remounting of the mould block on the support does not bring about any alteration in the physical characteristics of the components, and the securing nut screwed on the end of the pin is blocked against the second shoulder of the latter, at the same time preloading the elastic return member automatically to the preset value. The fitter cannot commit any assembly error and has no setting to carry out, and no component part can be forgotten and/or incorrectly mounted.

It is advantageous that the tubular sleeve has associated with it blocking means suitable for blocking it in rotation with respect to the support, once the abutment setting has been carried out. In practice, it is simple if the means for blocking the tubular sleeve comprise at least one lock nut screwed on the tubular sleeve and bearing on the support.

Owing to the simplification in the demounting/mounting operations which is brought about by the arrangement according to the invention, it becomes possible that systematically, whatever the intended use of the mould, the elastic return means comprise a plurality of metallic spring washers interposed between the plate of the head of the tubular sleeve and the housing. The disadvantages associated with springs made from synthetic material are thus avoided.

In a practical exemplary embodiment which is simple in terms of structure and of manufacture, that end of the pin which is secured to the mould block is screwed in the latter. Moreover, as a safety measure, there may be provision for that end of the pin which is screwed in the mould block to be, furthermore, adhesively bonded in the latter.

The arrangements according to the invention which have just been explained are employed in all types of mould with a compensating chamber. In this respect, the arrangements in question may, in particular, be implemented expediently in the moulds currently manufactured by the applicant, in which each mould block is of the composite type and comprises a shell equipped with the moulding recess and a shell carrier supporting said shell and itself supported by the support, with a compensating chamber between a support and the associated shell carrier, as described, for example, in the documents FR 2 733 176 and FR 2 813 231 in the applicant's name. The pin is then secured to the shell carrier.

Preferably, the unitary assemblies combining the elastic return means and the abutment means are four in number, by virtue of which the number of drill holes made in the support and the mould block or the shell carrier is reduced considerably, such that the mechanical resistance of these parts is not appreciably impaired.

The arrangements according to the invention prove to be particularly expedient in the high-capacity moulding installations of the turntable type which are equipped with a multiplicity of moulding devices (sometimes several tens) distributed on the periphery of a rotary framework: the changing of the mould blocks for the purpose of altering the manufacturing of the containers, which has hitherto been a lengthy operation on account of the large number of moulding devices to be dealt with, now proves to be much easier and much quicker with moulding devices designed according to the invention, so that the period of shutdown of the installation is reduced considerably, to the great satisfaction of the operators.

BRIEF DESCRIPTION OF THE DRAWINGS

The invention will be understood more clearly from a reading of the following detailed description of some preferred embodiments given purely by way of non-limiting example. This description refers to the accompanying drawings in which:

FIGS. 3A and 3B are partial sectional and partially external side views of a preferred embodiment of a unitary assembly according to the invention, mounted in a mould of the type of FIG. 1 and shown respectively in the assembled situation and in the disassembled situation of the mould; and FIG. 4 is a partial sectional and partially external side view of the same preferred embodiment of the unitary assembly according to the invention, mounted in a mould of a different type.

DETAILED DESCRIPTION OF THE DRAWINGS

Figure 1:
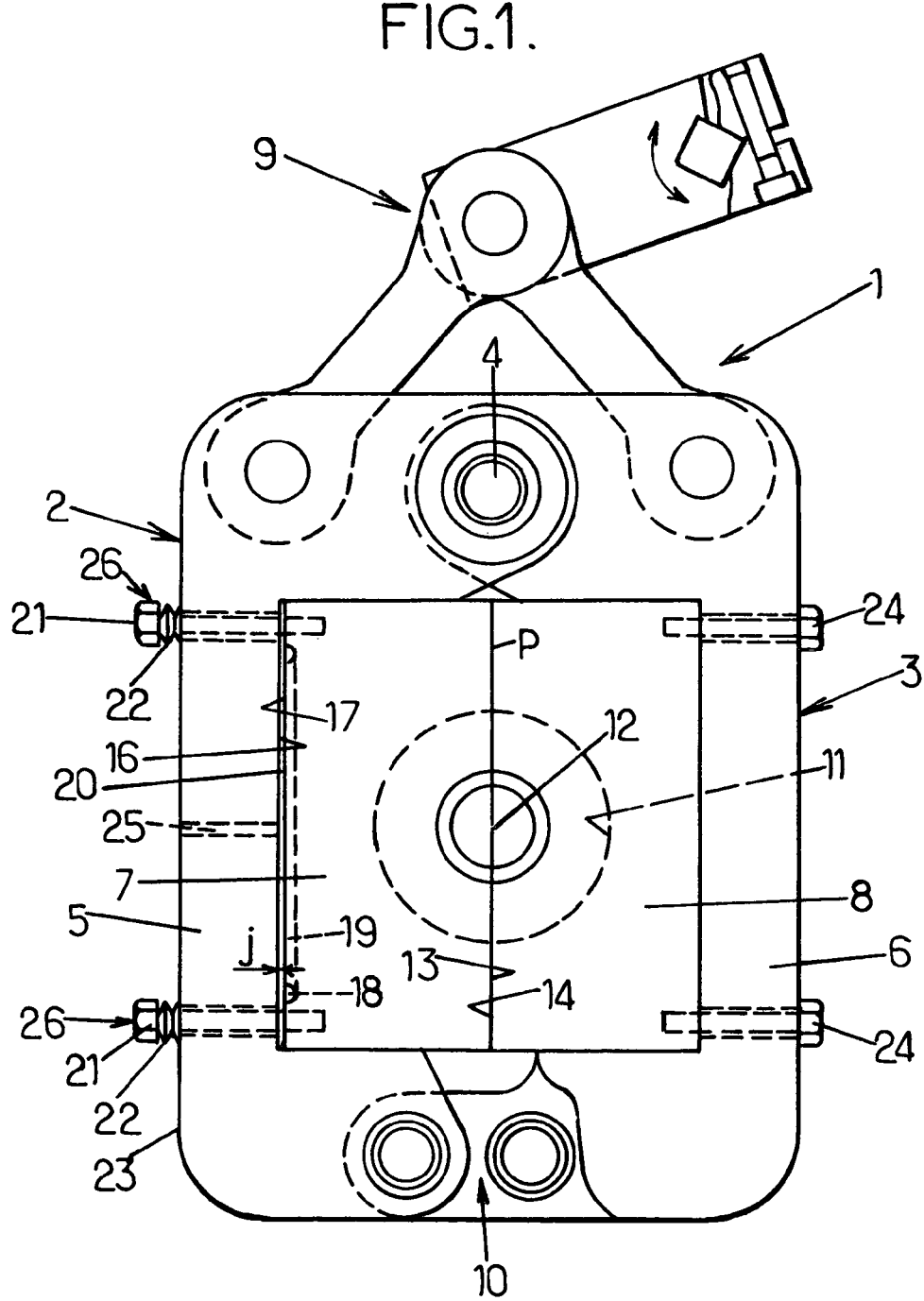
FIG. 1 is a diagrammatic top view of a mould designed according to the prior art, only the elastic return means of one of the mould blocks being shown.
Figure 2:
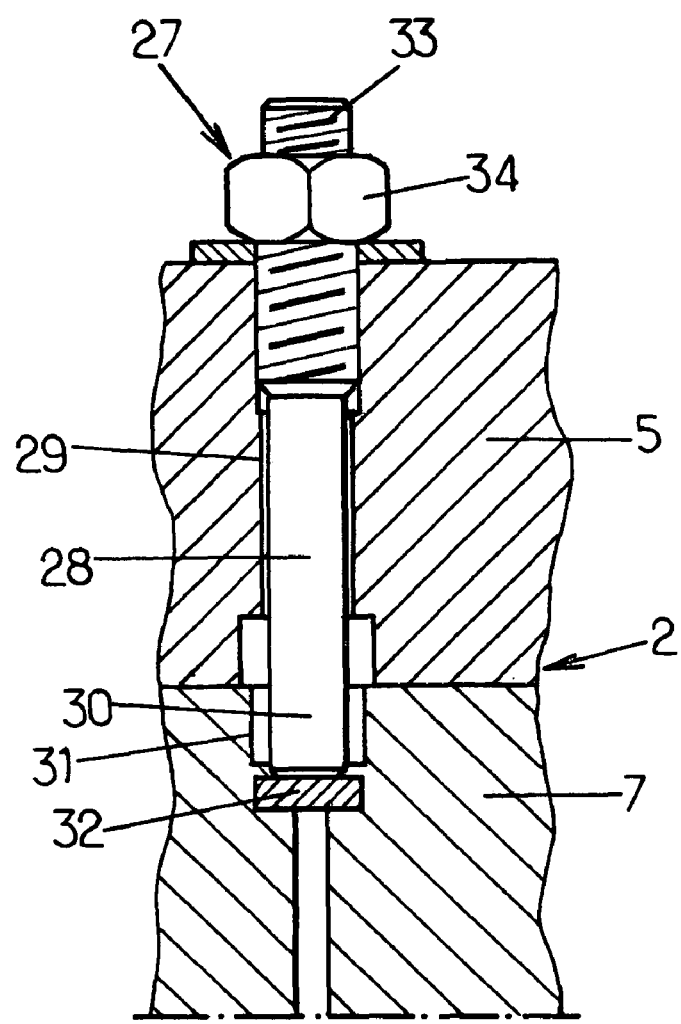
FIG. 2 is a sectional side view of part of the mould of FIG. 1, showing the abutment means associated with said mould block.

Reference will first be made to FIG. 3A in which the same reference numerals as in FIGS. 1 and 2 have been retained in order to designate the same members. For the sake of clarity, FIG. 3A shows only a portion of the support 5 and a corresponding portion of the mould block 7.

According to the invention, the elastic return means and the abutment means are equal in number and are combined respectively in pairs in the form of unitary assemblies. FIG. 3A illustrates such a unitary assembly, designated as a whole by the reference numeral 35, which is designed as follows.

A bore 36 passes through the support 5 on the outside of the compensating chamber (not shown in FIG. 3A) and substantially perpendicularly to the parting plane and issues in front of the mould block 7; this bore 36 is internally threaded at least over part of its length, especially at 37 in the vicinity of its orifice, as shown in FIG. 3A.

A pin 38 is engaged coaxially through the bore 36 of the support 5, and its inner end 39 is secured to the mould block 7. The pin 38 is equipped with a first radial annular shoulder 40 which faces its free end 41 opposite the aforesaid inner end 39, which free end 41 remains outside the support 5. In practice, as shown in FIG. 3A, the inner end 39 of the pin 38 is screwed in the mould block 7. In the actual exemplary embodiment illustrated, the mould block 7 comprises a receptacle 42 located in the continuation of the bore 36 of the support and coaxial to the latter, which receptacle 42 is prolonged by an internally threaded bore 43 of a diameter less than that of the receptacle 42, such that a radial annular shoulder 44 is thus defined. In turn, the externally threaded inner end 39 of the pin 38 possesses a reduced diameter, so as to define a radial annular bearing surface 45 for clamping on the shoulder 44 when the inner end 39 is screwed in the bore 43. Preferably, as a precautionary measure, furthermore, the end 39 of the pin 38 may be adhesively bonded in the bore 43.

A tubular sleeve 46 is screwed in the internally threaded part 37 of the bore 36 of the support 5, such that its inner end E comes into abutment against the first radial shoulder 40 of the pin 38. At its opposite end, the tubular sleeve 46 ends in a head 47 which remains outside the support 5. The head 47 may, for example, be shaped externally as a hexagonal nut, in order to make it possible to rotate the sleeve 46 with the aid of a spanner or of pliers, said head being shaped on top in the form of a plate 48.

A housing 49 is associated with the head 47 of the tubular sleeve 46 and caps at least the plate 48 of the latter. The housing 49 is designed in annular form and surrounds the free end 41 of the pin 38 (more specifically, surrounds a widened portion of the pin which defines a second radial annular shoulder 54 which faces the free end 41 of the pin and which will be dealt with in more detail later), so as to be capable of undergoing an axial displacement of limited amplitude with respect to the head 47 of the sleeve 46. For this purpose, retention means are provided for limiting the amplitude of said axial displacement. This retention means may consist in a simple way of a spring ring or circlip 50 which is retained in a groove made in the inner face of the housing 49 and which bears under a peripheral rim 51 of the plate 48 of the head 47 of the sleeve.

The elastic return means 26 are interposed between the plate 48 of the head 47 of the tubular sleeve 46 and the housing 49. The elastic return means 26 may comprise a plurality of metallic spring washers 52 stacked one on the other according to the required configuration, the stack bearing against the plate 48 and against the housing 49.

Finally, a nut 53 for preloading the elastic return means 26 is screwed on the free end 41 of the pin 38 until it comes into abutment against the aforesaid second radial shoulder 54 provided on the pin 38. In this position, the nut 53 bears on the housing 49 and pushes it in the direction of the plate 48, at the same time preloading the spring washers 52.

As a safety measure, the tubular sleeve 46 may advantageously have associated with it means for blocking in rotation, making it possible to block it with respect to the support 5, once it is in abutment against the shoulder 40 of the pin 38. For this purpose, in a simple way, a lock nut 55 may be provided which is screwed on the tubular sleeve 46 and is suitable for being clamped against the outer face 23 of the support 5.

By virtue of the arrangement of the unitary assembly 35 according to the invention which has just been described in detail with regard to FIG. 3A, the setting of the preload of the elastic return means 26 and the setting of the abutment E/40 are predetermined by the structure of the unitary assembly 35. Thus, these settings remain strictly independent of one another and without any influence on one another, and no repeat of these settings has to be carried out on the mould during mounting.

When the mould block is to be separated from the support, as shown in FIG. 3B, the tubular sleeve 46 remains secured to the support 5, without any alteration in its position, and the elastic return member 52 remains enclosed in the housing 49: since this member is not demounted, there is no risk of a possible faulty remounting (omission of washers, washers incorrectly positioned). In turn, the pin 38 remains secured to the mould block 7.

Subsequently, the remounting of the mould block 7 on the support 5 does not cause any alteration in the physical characteristics of the components. The end E of the tubular sleeve 46 comes to bear automatically against the first shoulder 40 of the pin 38, and the securing nut 53 screwed on the end 41 of the pin 38 is blocked against the second shoulder 54 of the latter, thus automatically preloading the elastic return member 52 to the preset value. The fitter cannot commit any assembly error and has no setting to carry out, and no component part can be forgotten and/or incorrectly mounted.

The implementation of the arrangements which have just been described seems necessarily to prove particularly expedient in the moulds of composite structure currently installed by the applicant in the blowing or draw-blowing installations which the applicant manufactures. As shown in FIG. 4, these are essentially moulds of cylindrical general shape, in which each mould block is of the composite type and comprises a shell equipped with the respective moulding recess and a shell carrier supporting said shell and itself supported by the corresponding support. Thus, the mould block 7 more specifically addressed by the invention comprises the shell 55 and the shell carrier 56, while the other mould block 8 comprises the shell 57 and the shell carrier 58. Such moulds with a compensating chamber are described, in particular, in the documents FR 2 733 176 and FR 2 813 231 in the applicant's name, to which reference may be made. In the context of the invention, then, the shell carrier 56 is arranged for the purpose of compensation, as explained above, and, in FIG. 4, the same reference numerals have been retained in order to designate the members or parts identical to those of FIG. 3. More particularly with regard to the arrangements belonging to the invention, here, the receptacle 42 and the internally threaded bore 43 are pierced in the shell carrier 56, the rest of the arrangement remaining identical to what was described above.

What is claimed is:

1. Device for the moulding of containers, especially of bottles, made from thermoplastic, such as PET, by the blowing or draw-blowing of heated preforms, which moulding device comprises at least one mould comprising at least two half-moulds respectively comprising two supports and two mould blocks defining a parting plane in the closing position of the mould, a leak-tight compensating chamber being defined between the support and the mould block of a half-mould, such that, by a fluid being injected under pressure into the compensating chamber, said mould block is moved apart from said support, a plurality of elastic return means and a plurality of abutment means being interposed between said support and said mould block and being arranged such that, in the absence of fluid under pressure in the compensating chamber, said mould block occupies a retracted position in the support, wherein said elastic return means and said abutment means are equal in number and are combined respectively in pairs in the form of unitary assemblies each comprising:

a bore passing through the support on the outside of the compensating chamber and substantially perpendicularly to the parting plane and issuing opposite the mould block, a pin passing coaxially through said bore of the support and having one end secured to the mould block, said pin comprising a first radial annular shoulder facing its free end, a tubular sleeve screwed into said bore such that its inner end bears on said first radial shoulder of the pin, said tubular sleeve having a head which is external to the support and which defines a bearing plate, a housing capping said head of the tubular sleeve and capable of an axial displacement of limited amplitude with respect to said head of the sleeve, elastic return means interposed between the head of the tubular sleeve and the housing, and a nut for preloading the elastic return means, which is screwed on the free end of the pin, at the same time pushing the housing against a second radial shoulder of said pin, whereby the setting of the preload of the elastic return means and the setting of the abutment remain independent of one another and without any influence on one another and are predetermined by the two radial shoulders of the pin.

2. Moulding device according to claim 1, wherein the tubular sleeve has associated with it blocking means suitable for blocking it in rotation with respect to the support, once the abutment setting has been carried out.

3. Moulding device according to claim 2, wherein the means for blocking the tubular sleeve comprise at least one lock nut screwed on the tubular sleeve and bearing on the support.

4. Moulding device according to claim 1, wherein the elastic return means comprise a plurality of metallic spring washers interposed between the head of the tubular sleeve and the housing.

5. Moulding device according to claim 1, wherein that end of the pin which is secured to the mould block is screwed in the latter.

6. Moulding device according to claim 5, wherein that end of the pin which is screwed in the mould block is, furthermore, adhesively bonded in the latter.

7. Moulding device according to claim 1, wherein each mould block is of the composite type comprising a shell equipped with a moulding recess and a shell carrier supporting said shell and itself supported by the support, and wherein the pin is secured to the shell carrier.

8. Moulding device according to claim 1, wherein the unitary assemblies combining the elastic return means and the abutment means are four in number.

9. High-performance rotary moulding device of the turntable type comprising a multiplicity of moulds distributed peripherally on a rotary framework, wherein each mould is designed according to claim 1.

* * * * *